United States Patent [19]
Wirsing

[11] 3,981,605
[45] Sept. 21, 1976

[54] X-Y TABLE FOR MACHINING

[75] Inventor: Donald Edward Wirsing, Schaumburg, Ill.

[73] Assignee: Frank Tessitore, Glenview, Ill.

[22] Filed: Nov. 3, 1975

[21] Appl. No.: 628,549

[52] U.S. Cl. ............................ 408/88; 408/16; 408/234; 90/58 R; 90/DIG. 28; 248/23; 308/6 R

[51] Int. Cl.² ............................ B23B 39/00

[58] Field of Search ............. 408/234, 237, 72, 87, 408/88, 16; 90/DIG. 28, 11 R, 15 R, 16; 83/565, 556, 562, 71, 925 CC; 248/429, 430, 23; 308/6 R, 3 A

[56] References Cited
UNITED STATES PATENTS

| | | | |
|---|---|---|---|
| 2,864,269 | 12/1958 | Mottu | 408/234 |
| 3,180,183 | 4/1965 | Stanley et al. | 408/234 X |
| 3,749,509 | 7/1973 | Lukoshnikov | 248/23 X |
| 3,777,616 | 12/1973 | Mueller | 308/6 R X |

*Primary Examiner*—Gil Weidenfeld
*Attorney, Agent, or Firm*—Bernard E. Franz

[57] ABSTRACT

Precision ball bushings running on pecision shafts provide the basic movement and positioning for both the X and Y axes. For smooth precise operation there must be practically nil deflection of the shafts. To accomplish this, cam followers running on guide bars are provided to carry the load; the guide bars being supported along their entire length. The work bed, which can accommodate 4 × 8 foot plates, has replaceable nylon pieces screwed on to steel tubing of the frame assembly. Thus, when the drill penetrates the work, it usually encounters the air space, but if it strikes a nylon piece, there is no adverse affect on the operation, and the nylon may eventually be replaced.

28 Claims, 34 Drawing Figures

X-Y TABLE FOR MACHINING

BACKGROUND OF THE INVENTION

This invention relates to the field of coordinate positioning arrangements for machine operations such as drilling.

One well known type of machine with coordinate positioning is a drill press with a movable table mounted in a saddle. The table may be moved in the saddle along a lead screw for one coordinate, and the saddle moves along a lead screw for another coordinate. These units may also be used for other machine operations, such as milling. However, the movement of the table in ths saddle is limited to a few feet, and the movement of the saddle to about one foot. Thus, the machines are not suitable for handling very large material on the work table.

An elementary method of handling objects such as large steel plates is to have a person manually lay out the pattern of holes, center punch each one, and then drill with a hand drill. There are also methods using a magnetic drilling head.

There are also known arrangements for handling large plates with great accuracy (0.001 inch) which are very expensive. These include a radial drill press in which a drill head moves out on arms; and a jig boring mill with a moving table. However, there are many applications in which less accuracy is required, for example 1/64 inch may be adequate. In such situations the expensive machines cannot be justified; their accuracy is wasted. On the other hand, the manual methods are too slow and cumbersome.

SUMMARY OF THE INVENTION

An object of this invention is to provide apparatus for handling large pieces of work, which is relatively inexpensive, simple and fast to use, and sufficiently accurate.

According to the invention, a carriage unit is carried on bearing devices running on main shafts having a long span, and also on rollers running on guide bars which are attached at closely spaced intervals to a frame assembly; so that the position may be set along the shafts, while the carriage unit is supported by the rollers on the guide bars to avoid any significant deflection of the shafts. The carriage unit has cross shafts for bearing devices which carry a machining assembly. Further, according to the invention, the carriage unit also has guide bars attached at close spaced intervals to the structure thereof, with the machining assembly supported on rollers running thereon to prevent deflection of the cross shafts.

Another feature relates to nylon strips on the work bed; the strips being attached to steel tubing of the frame assembly. Thus, when machine tools (such as drills) penetrate the work, they usually encounter air space, but if they strike a nylon piece, there is no adverse affect on the tool, and at infrequent intervals the nylon pieces may be simply replaced.

A particular advantage of the coordinate positioning arrangement, in comparison to arrangements using lead screws, is that the machining head may be positioned very rapidly and clamped in place. The carriage unit and machining assembly are moved by hand, not being tied down by slow lead screws.

Other objects, features, and advantages will become apparent in the following description.

DESCRIPTION OF THE PREFERRED EMBODIMENT

Figures 1, 3:
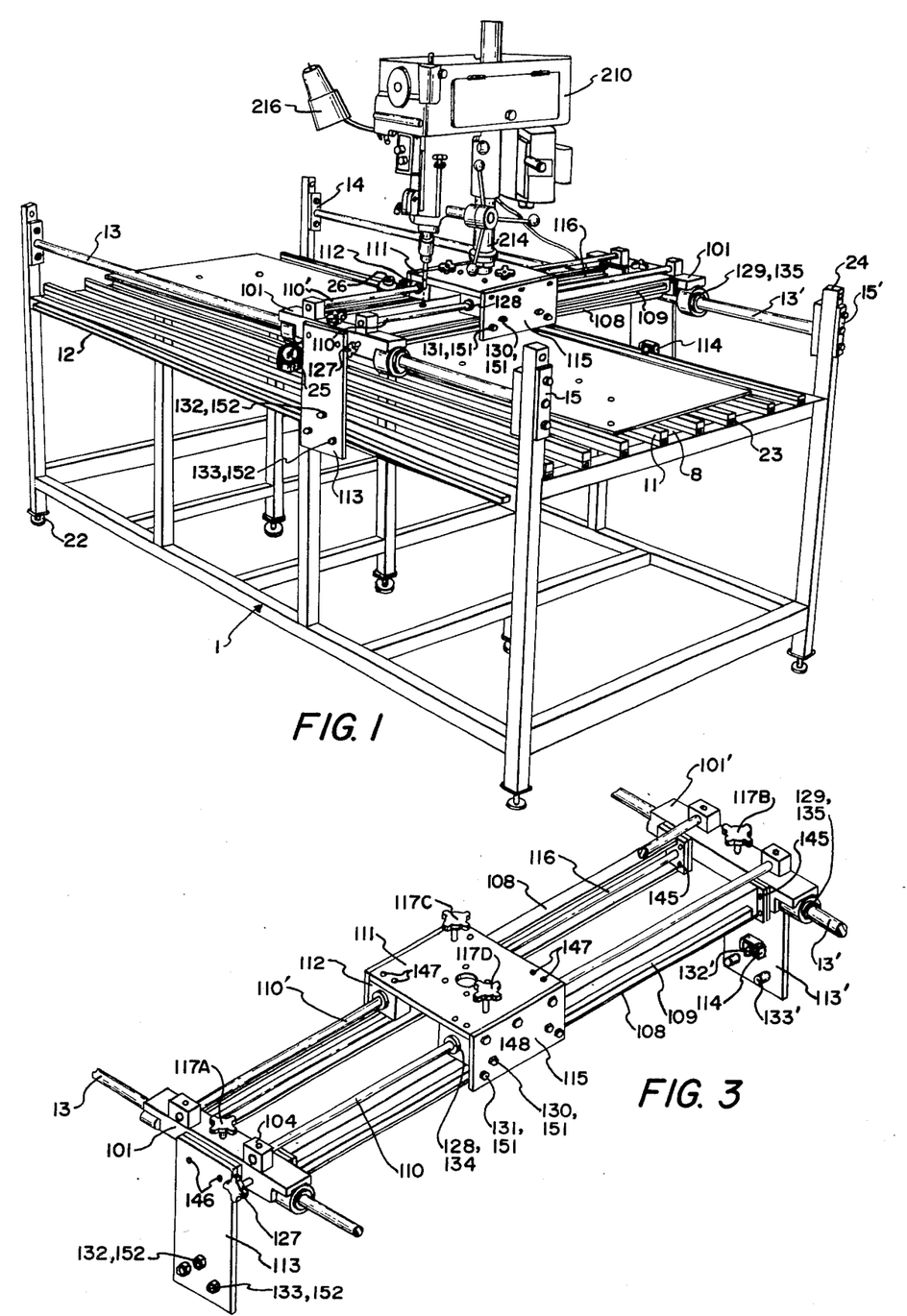
FIG. 1 is a perspective view of a complete machining assembly with X—Y positioning.
FIG. 3 is a perspective view of the carriage unit.

The apparatus for drilling large plates, with X—Y positioning, is shown in FIG. 1. It comprises a frame assembly shown in FIG. 2, a carriage assembly shown in FIG. 3, and a drilling head assembly on a cross slide partly shown in FIG. 4.

In both the X and the Y directions, the motion for positioning the drill head is basically controlled by precision ball bushings running on precision shafts. The shafts in the X direction are 13 & 13', and in the Y direction 110 & 110'. The shafts are manually straight, so that when the carriage is moved in the X direction, there is no measurable movement in the Y direction. The span of the shafts is fairly long; but smooth precise operation requires that the deflection be practically nil. To accomplish this, cam followers running on guide bars 12 & 12' in the X axis, and 109 & 109' in the Y axis are provided. These guide bars provide positive support along the entire length. Note that the operation is very fast compared to the prior art method with lead screws. The carriage is rapidly pushed along the X axis to the desired position and locked; and then the drill head is positioned for the Y axis and locked. Note that during drilling operations, upward forces are exerted, which are resisted by the cam followers on the under sides of the guide bars.

The positioning accuracy in both the X and Y directions is such that the error is less than 1/64 inch. The position is indicated on indicators 25 and 26 having a dial driven by bearing on the shafts 13 and 110' respectively. Such indicators are available under the name TRAVADIAL obtainable from Southwestern Industries, Inc. The indication on the dial is in 0.001 inch.

FRAME ASSEMBLY

Figure 2:
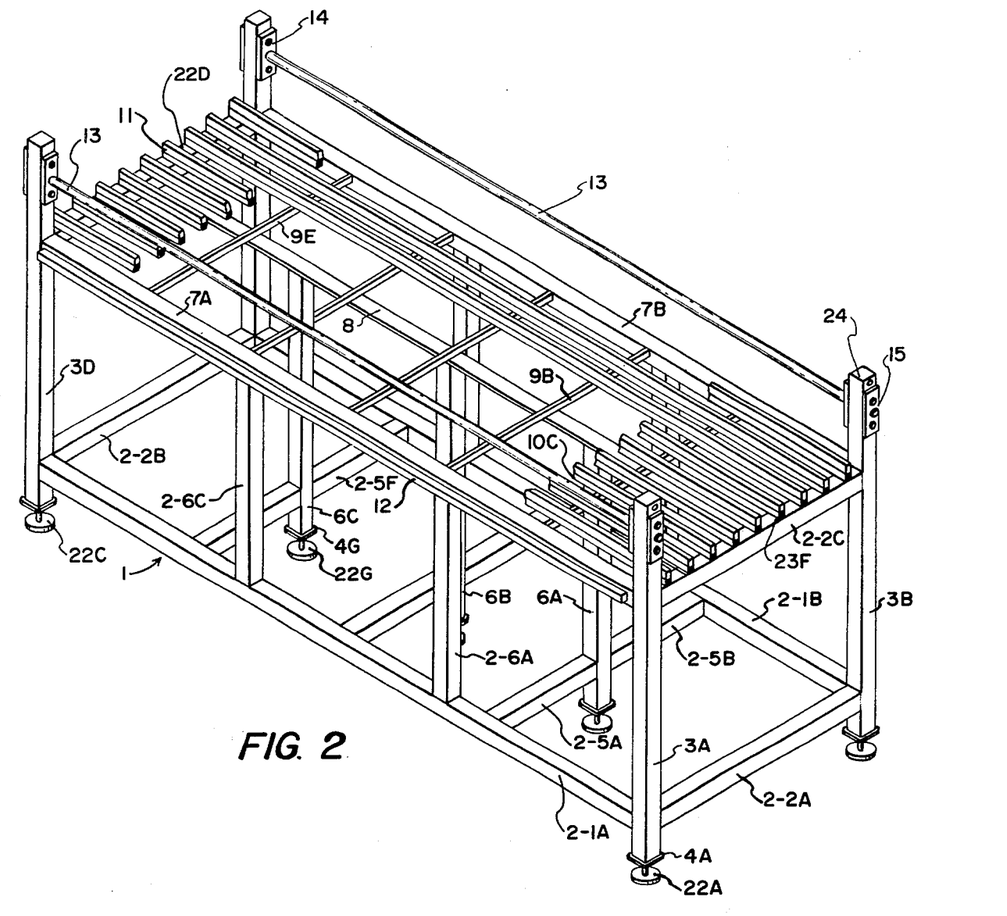
FIG. 2 is a perspective view of the frame assembly, with the work bed partly broke away to better show the frame.

The basic structure of the frame assembly is a weldment 1. Items of two-inch square 11-gate steel tubing comprise two length-wise bottom pieces 2-1A & 2-1B and two lengthwise top pieces 7A & 7B which are from 96 5/8 inch stock finished to 96½ inches; four crosswise pieces 2-2A, 2-2B, 2-2C, 2-2D at the bottom and top ends of 51 5/8 inch stock finished to 51½ inches; four pieces 3A, 3B, 3C, 3D for the corner legs of 41 3/4 inch stock; three pieces 6A, 6B, 6C for center legs of 28 inch stock; six pieces 2-5A to 2-5F at the bottom to the center legs of 24 7/8 inch stock finished to 24¾ inches; and four pieces 2-6A to 2-6D vertically on the sides of 20⅛ inch stock finished to 20 inches. Thus, the frame includes a total of 25 pieces of the two-inch square tubing, with six different lengths.

Each of the seven legs 3A to 3D & 6A to 6C has a pad 2½ inches square and ½ inch thick of cold rolled steel welded to the bottom thereof. These pads 7A to 7G each has a 27/64 inch hole drilled in the center thereof, tapped with ½ - 13 threads. After the frame is welded, these holes are used for leveling screw 22A to 22G, which may be obtained from Reids as catalog No. TL-2. The four corner legs 3A to 3D also have caps 24A to 24D closing the top end. These caps may be either 2 inch square by ¼ inch thick cold rolled steel, or 2 inch plastic caps obtainable from Plastiguide, catalog No. 132-BB-1402. Each of the four corners legs 3A to 3B has four 17/32 inch holes drilled along the vertical center line of one side through the opposite side; the first hole having its center 35¼ inches from the bottom of the foot pad, and the others being above it two inches between centers. The overall all length of the corners legs from the top of the cap to the bottom of the pad is 42½ inches.

The upper side members 7A & 7B each have eight 11/32 inch holes drilled along the horizontal center line, with the end ones having centers 1⅞ inches from the end, and the others 14¼ inches between centers.

The frame weldment further includes a cross strap 8 - main frame upper center - of cold rolled steel material ½ × 2 × 96⅝ inches, finished to 96½ inches long. This strap 8 extends between the upper end members 2-2C & 2-2D, and the 2-inch side covers the tops of the center legs 6A, 6B, 6C. Next there are five tie bars 9A to 9E - main frame upper - of cold rolled steel material ½ × 1 × 51⅝, finished to 51½ inches long. These tie bars have the ½-inch side resting on the strap 8, and extend between side members 7A & 7B. They are placed 16 inches between centers and from the edge of the end ones to the inner edges of members 2-2C & 2-2D. There is 22⅝ inches between the closest edges of leg 2-6C and member 2-2B, and 24⅝ inches between the center of leg 6B and the center of each of legs 6A & 6C. There is 32 inches between the closest edges of members 3D and 2-6C, and 30½ inches between centers of members 2-6C & 2-6A. The vertical distance between the bottom of the legs pad 4A to 4G and the bottom of strap 8 is 28½ inches. The center line of the holes in members 7A & 7B is ½ inch above this.

The frame weldment also includes nine bed support bars 10A to 10I, the material being ¾ × ¾ × 16 gage × 100½ inch steel tubing. These bars each have six 9/32 inch holes drilled along the center line of the top side and through the opposite side, with 19 inches between centers and 2¾ inches from the ends. These bed support bars are placed on top of the end members 2-2C & 2-2D and the tie bars 9A to 9E. They are six inches between centers and 1⅜ inches from the side members 7A & 7B.

All of the members mentioned above as being part of the weldment frame 1 are welded together. The 18 ends of the bed support bars 10A to 10I are covered with ¾ inch plastic tube caps 23A to 23R (23F is indicated) obtainable from Plastiguide catalog No. 132-BB-1179.

Figure 5:
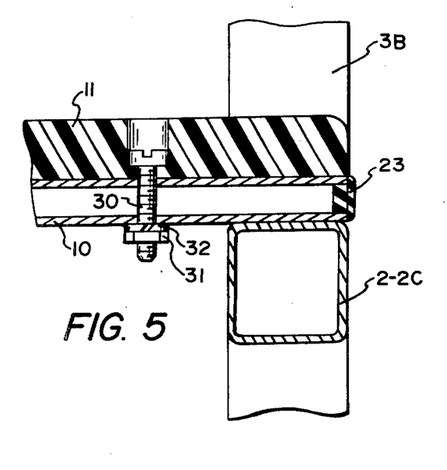
FIG. 5 is a vertical sectional view along the center line of one of the nylon drill bed pieces and adjacent structure.

The drill bed comprises nine pieces 11A to 11I of ¾ × 1 × 100½ inch nylon. The upper side of each end is rounded with a 3/8 inch radius. Each piece has six 9/32 inch holes drilled through along the center line of a ¾ inch side, with each hole counter bored ⅝ inch deep on the top side. The holes are 19 inches between centers, 2¾ inches from the ends. The nylon pieces 11A to 11I are fastened on top of the bed support bars 10A to 10I with ¼-20 × 1½ inch long socket (or slotted) head cap screws, using lockwashers and nuts on the bottom. Some of the nylon pieces and bed support bars are borken away in FIG. 2, to show other portions of the frame. FIG. 5 shows a vertical sectional view along the center line of the end of one of the nylon drill bed pieces 11 and a bed support bar 10 on the member 2-2C. A portion of leg 3B appears in back. The screw 30, lockwasher 32 and nut 31 are shown for one hole. A work piece W is shown on the bed in FIG. 1.

The structure of the drill bed is a significant feature. The nylon pieces 11 are replaceable. When a drill penetrates through the work, it will either come between the supports, or it will go into a nylon piece. Thus, the structural steel of the frame is not damaged. Also, if the drill strikes the edge of a nylon piece, it is not deflected. The nylon pieces will tolerate a large amount of drilling into them; and when eventually they have seen a lot of use, they may be easily replaced.

Figure 6:
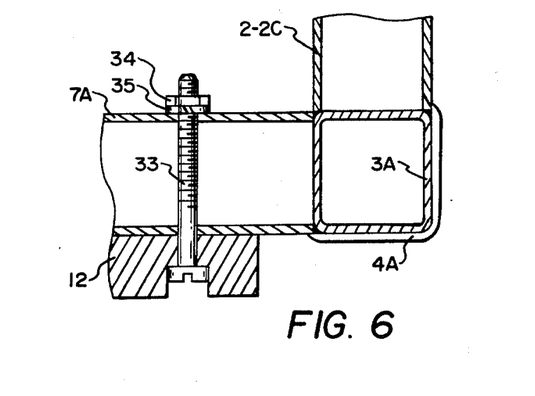
FIG. 6 is a horizontal sectional view of a guide bar for X axis and adjacent structure.

A guide bar 12 is attached to member 7A. A similar guide bar on member 7B is hidden from view in FIGS. 1 and 2. Each of these guide bars is made from 1 inch square by 95 inch long cold rolled steel. Each has eight holes of 11/32 inch drilled through and counter bored ⅜ inch deep along a center line of one side. The holes are 13¼ inches between centers, and 1⅛ inches from the ends. FIG. 6 is a horizontal sectional view of the end of guide bar 12, and the end of member 7A which is welded to leg 3A. The screws 33 are 5/16 - 18 × 3 inches long socket (or slotted) head cap screws. They are held by lockwashers 35 and nuts 34.

Figure 7:
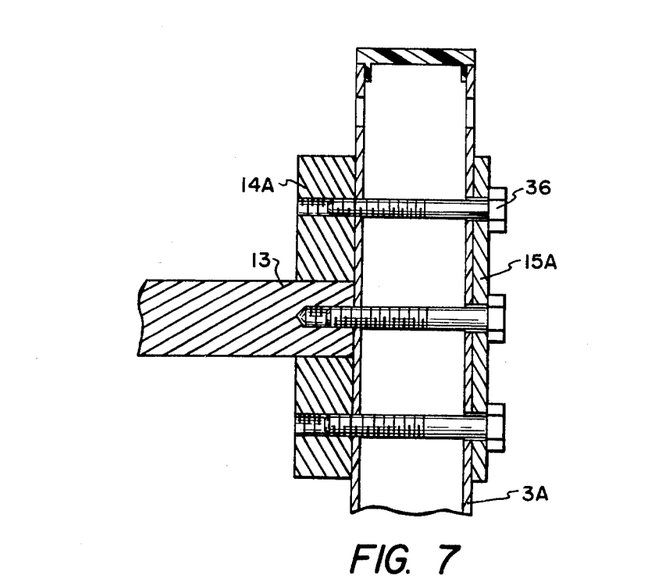
FIG. 7 is a vertical sectional view of a corner leg at the top and the end of an X axis shaft.

The shaft supports for the X axis shafts 13 and 13' comprise carriage shaft supports 14A to 14D and end caps 15A to 15D attached to the corner legs 3A to 3D respectively. FIG. 7 is a vertical sectional view through the center of leg 3A. The shaft support 4A is made from 1 × 2 × 6 inch cold rolled steel. On the 2 × 6 inch face, a hole is bored for the shaft, with tolerance limits of 1.500 and 1.499 inches. Two holes are drilled in this face with center lines one inch from each end, with a 27/32 inch drill and tapped for ½ - 13 threads. The end cap 15A is made from ¼ × 2 × 6 inch cold rolled steel. It has three 17/32 inch holes drilled in the 2 × 6 inch face along the long center line, with 2 inches between centers and 1 inch from each end. The shafts 13 and 13' are "Thomson" class S shafting of circular cross section 1½ inches in diameter, and 96½ inches long. They are drilled with 27/64 inch holes on each end and tapped with ½ - 13 threads. The shaft 13, support 14A and end cap 15A are attached to leg 3A as shown in FIG. 7, using ½ - 13 × 3 inch long hexagon head cap screws. Note a feature here in that there is a fourth hole in the leg. This makes it possible to raise the shafts 13 and 13' by 2 inches, if very thick plates are being handled as the work W.

Carriage Assembly

The carriage assembly starts with two identical weldment assemblies 101 & 101'. The parts for one weldment are shown in an exploded view in FIG. 8. The base is a structural channel 102 which is 3 × 9 lb. × 17¾ inches long. A hole 160 in the center of the top is drilled 27/64 inch and tapped for ½ - 13 threads. The channel measures 3 inches across the top and 2⅛ inches high on the sides. At each of the four corners, the sides are cut along a line 15/16 inch from the top surface and from that line 2¼ inches from the ends to the bottom. A cutaway view shows an indent 161 in the back side which is one inch wide and ½ inch high, with its left edge 3⅞ inches from the left end.

Figure 8:
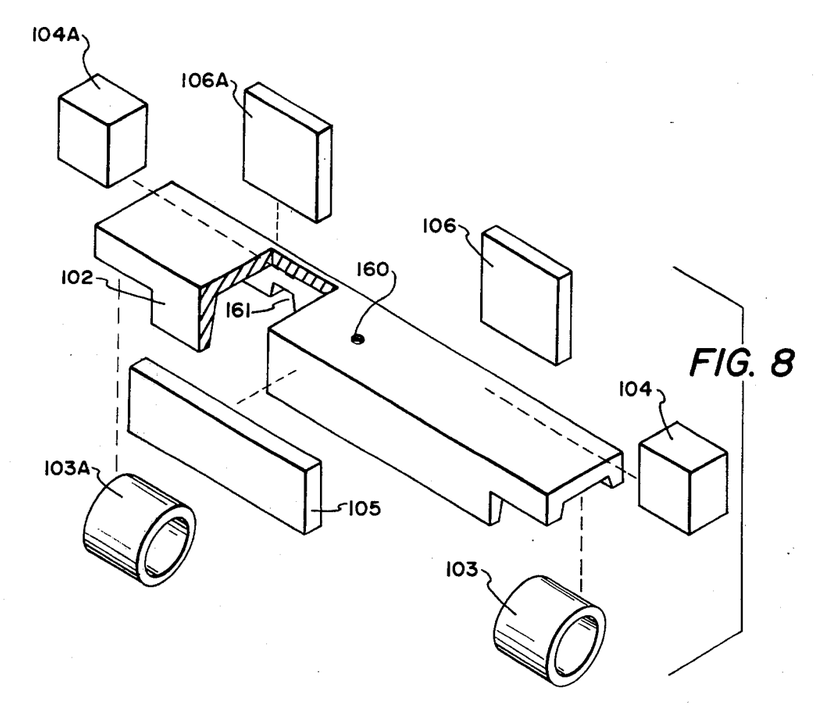
FIG. 8 is an exploded perspective view of a carriage weldment assembly.

Two main bosses 103 & 103A for the carriage are each made from cold drawn round tubing 3¼ inches outside diameter by 9/16 gage by 25/16 inches long. Two blocks 104 & 104A for the cross shafts of the carriage are 1½ × 2 × 2 inches cold rolled steel. One pad 105 for the roller support plate of the carriage is ⅝ × 3 × 7 inch cold rolled steel. Two pads 106 & 106A for the cross channel of the carriage are ½ × 3 × 3 inch cold rolled steel.

Figure 9:
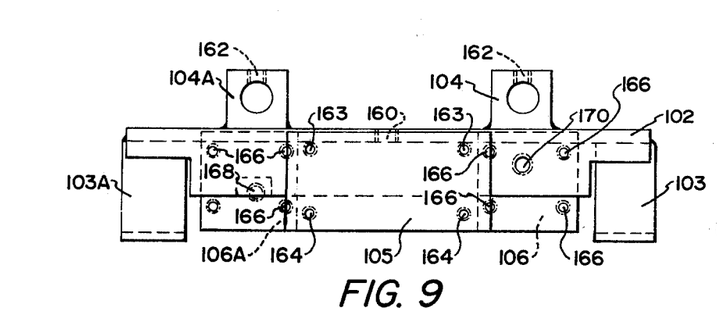
FIGS. 9, 9A and 9B are elevational, end, and plan views respectively of the carriage weldment assembly of FIG. 8 after welding and machining.
Figure 9A:
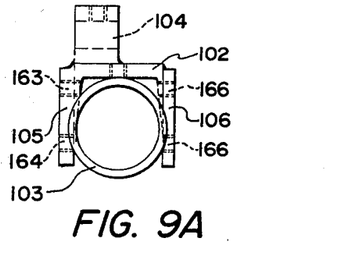
Figure 9B:
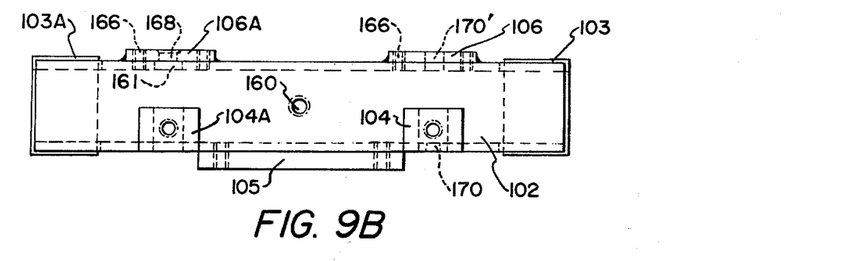

FIGS. 9, 9A, and 9B show different views of the carriage assembly 101 after the parts shown in FIG. 8 are first welded together and then machined. The bosses 103 & 103A have their ends projecting ⅛ inch beyond the ends of channel 102; and their center lines are 2⅛ inches below the top surface of channel 102. The blocks 104 & 104A each have one of the 2 × 2 inch faces in the same plane as the front side of channel 102, with their outer edges 3⅜ inches from the ends of channel 102, their inner edges 7 inches apart, and the 1½ inch dimension extending back from the front edge. The pad 105 is placed in front with its upper edge ⅛ inch below the top surface of channel 102, the 7-inch dimension from left to right and centered so that each end is 5⅜ inches from an end of channel 102, and the 3-inch dimension vertical. The pads 106 & 106A are placed in back with their upper edges ⅛ inch below the top surface of channel 102, the outer edges 2¾ inches from an end of channel 102, and the inner edges 6¼ inches apart. The parts are welded to channel 102 in the positions stated above.

The carriage assembly 101 is then machined. The bosses 103 & 103A are bored with tolerance limits of 2.375 and 2.376 inches. The blocks 104 & 104A are bored with holes from front to rear having a diameter with tolerance limits of 1.000 and 1.0005 inch, the center lines held at 90° from the plane of the upper surface of channel 102; and the center lines located 4½ inches from the ends of bosses 103 and 103A, 9.000 inches apart and 3.250 inches above the center lines of bosses 103 & 103A. Set screw holes 162 are drilled and tapped in the tops of blocks 104 & 104A.

The pad 105 has two upper holes 163 and two lower holes 164 drilled and tapped, with center lines horizontally 5½ inches apart and 6¼ inches from the outer ends of bosses 103 & 103A. The center lines of holes 163 are 1½ inches above the center lines of bosses 103 & 103A; and the center lines of holes 164 are 2 inches below those of holes 163.

There are four holes 166 drilled and tapped in each of pads 106 and 106A, which extend through the back wall of channel 102. Horizontally the center lines of holes 166 have the left ones of pad 106A 3¼ inches from the outer end of boss 103A, 2¼ inches between them on each pad, and 7 inches between the inner ones of the separate pads. Vertically the center lines of these holes 166 are 1½ inches apart, and the upper ones are 1⅜ inches above the center line of bosses 103 & 103A. The 14 holes 162, 163, 164, 166 are each drilled 5/16 inch and tapped for 3/8 - 16 threads.

A hole 168 in pad 106A is drilled from the back side with a 27/64 drill, countersunk to a 1/16 depth, and tapped for ½ - 13 threads. The indent 161 in the rear wall of channel 102 provides clearance for this hole. Its center line vertically coincides with that of the bored hole in block 104A, and horizontally is 1/32 inch above the center line of boss 103. A pair of holes 170-170' have the same center line, which vertically coincides with that of block 104, and horizontally 15/32 inches above the center line of boss 103. Hole 170 is 17/23 drilled in the front wall of channel 102. Hole 170' is ¾ drilled through the back wall of channel 102 and pad 106.

A special drill jig (not shown) is used for holes 166, 168, and 170'. It has shafts for placing in the bored holes of blocks 104 and 104A with specially shaped locating pins inserted through holes of these shafts. The holes for drilling are fitted with drill bushings.

Figure 10:
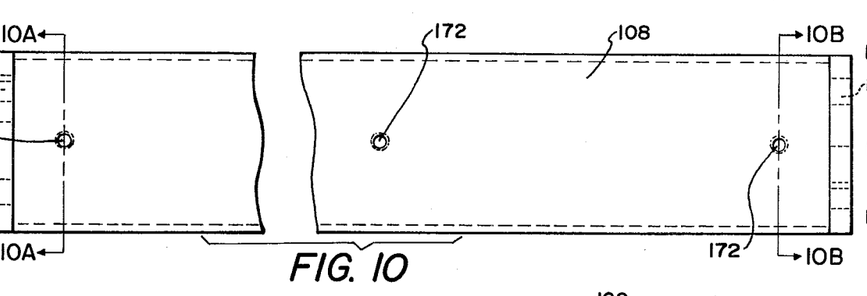
FIGS. 10, 10A and 10B comprise an elevational and two sectional view of one of two channels extending between the ends of the carriage unit.
Figure 10A:
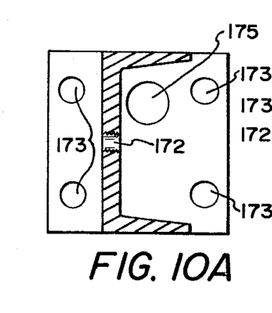
Figure 10B:
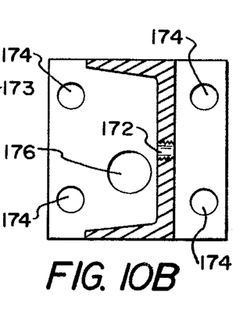

As shown in FIG. 3, the carriage assembly includes two carriage cross channels 108 and 108'. FIGS. 10, 10A, and 10B show views of cross channel 108. it is made from a 3 inch × 5.0 lb. × 49 inch long structural channel, and two pieces of ½ × 3 × 3 inch hot rolled steel. The latter two pieces are welded to the two ends respectively of the channel, so that the overall length is 49¾ inches. The ends must be parallel and 90° to the channel. The end pieces are each finished to a thickness of ⅜ inch. Note in FIG. 3 that the channel is mounted with the legs horizontal and the center section vertical. There are seven holes 172 (3 shown in FIG. 10) along the center line of the channel, made with a No. F(0.257 inch) drill and tapped for 5/16 - 18 threads. These holes are 6¾ inches between centers, and 1¼ inches from the outer face of the ends. FIGS. 10A and 10B are sectional views looking left and right respectively, through the left and right holes respectively. There are four holes 173 in the left end and four holes 174 in the right end, all drilled 13/32 inch. These holes 173, 174 are vertically 1¾ inches between center lines with the upper center line ⅝ inch below the top edge; and horizontally 2¼ inches between center lines with the near ones ½ inch from the near edge of the channel. A hole 175 in the left end, and a hole 176 in the right end are each drilled ¾ inch. Both holes 175, 176 have the vertical center line 1⅜ inches from the front edge. Hole 175 has its center 7/8 inch below the top edge; while hole 176 has its center 1 15/16 inches below the top edge. The carriage cross channels 108 & 108' are attached to the carriage assemblies 101 & 101' using 16 ⅜ - 16 × 1 inch long hexagon head cap screws 145.

Figures 11, 14, 14A, 17, 18, 18A, 19, 20:
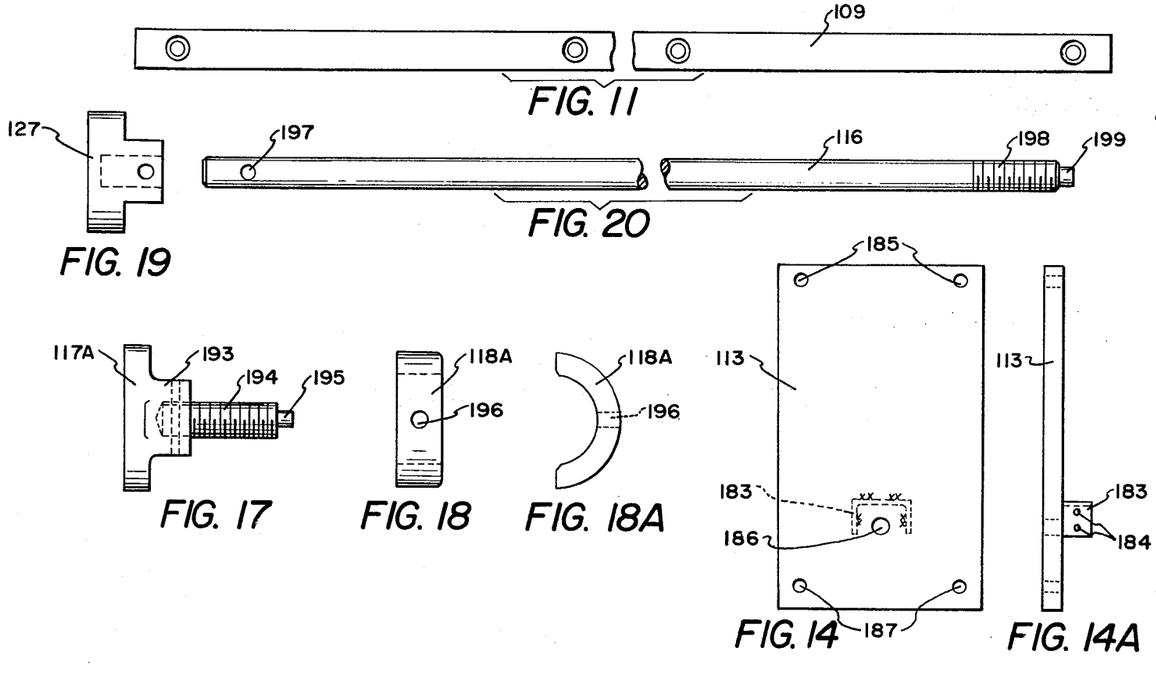
FIGS. 11 and 11A comprise an elevational and an end view of one of the guide bars for the Y axis.
FIGS. 14 and 14A comprise an elevational and a side view of one of the carriage roller support plates for the X axis.
FIG. 17 is a view of a carriage lock clamp screw.
FIGS. 18 and 18A comprise two views of a carriage lock clamp collar.
FIG. 19 is a view of a hand knob for an auxiliary carriage lock clamp screw.
FIG. 20 is a view of one auxiliary carriage lock clamp screw.
Figure 11A:
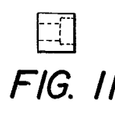

There are two carriage cross support bars 109 & 109' attached respectively to carriage cross channels 108 & 108' (bar 109' is hidden from view in FIGS. 1 and 3). Bar 109 is shown in FIGS. 11 and 11A. It is made from a piece of ⅝ × ⅝ × 48½ inch cold rolled steel. Along the center of one face there are seven holes drilled 11/32 inch and counterbored. The bar 109 is attached to the channel 108 with 5/16 - 18 socket (or slotted) head cap screws 144; and in like manner a bar 109' is attached to channel 108'.

The cross shafts 110 and 110' are one inch circular by 56⅝ inches long "Thomson" class S shafting. They are held in place by four ⅜ - 16 × ½ inch long set screws in holes 162.

Figure 12:
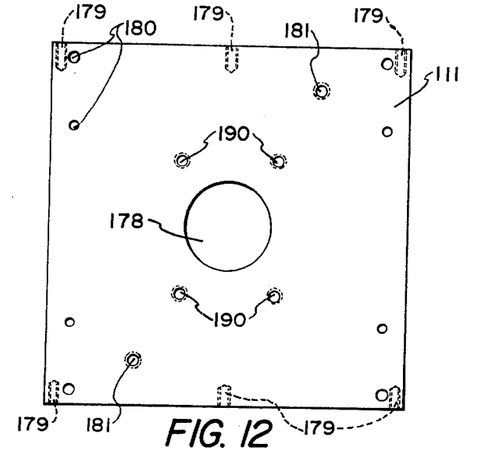
FIGS. 12 and 12A comprise a plan and an elevational view of the drill head carrier plate.
Figure 12A:
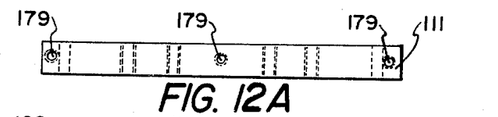

The drill head carrier plate 111 is shown in FIGS. 12 and 12A. It is made from 1 × 12 × 12¼ inch cold rolled steel. It has a large 3 1/32 inch 178 hole in the center. On each of the 1 × 12¼ inch sides there are three holes 5/16 inch drilled to a depth of one inch and tapped for ⅜ - 16 threads to a depth of ¾ inch. These holes 179 are along the horizontal center line of the sides, with one in the center, and the others with their centers ⅜ inch from the end. On the 12 × 12¼ face, there are two holes 180 near each corner. These holes 180 all have one center line 13/16 inch from a 12 inch side; and each pair is 2¼ inches between centers, one center ⅜ inch from a 12¼ inch side. These eight holes are drilled 13/32 inch. There are four holes 190 around the center hole, each having its center 4½ inches from a 12 inch side, and 3¾ inches from a 12¼ inch side, these holes being drilled 5/16 inch and tapped ⅜ - 16. There are two holes 181 shown in the upper right and lower left of FIG. 12 which have centers 3 inches from a 12 inch side and 1½ inches from a 12¼ inch side, each drilled 27/64 inch and tapped 3/8 - 16.

Figure 13:
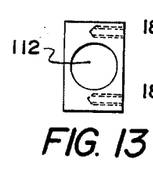
FIGS. 13 and 13A comprise an end and a top view respectively of one of the bosses for the bearings of a Y axis shaft.
Figure 13A:
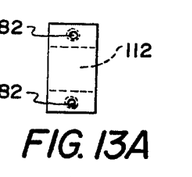

FIGS. 13 and 13A show one boss 112, for the carriage cross shaft bearings of the Y axis. There are four of these bosses for attachment on the underside of plate 111, in the four corners. They are each made from 2 × 3 × 1¼ inch aluminum, finished to a thickness of 1⅝ inches. In the center of a 2 × 3 inch face a hole is bored with tolerance limits of 1.5625 and 1.563 inches. The hole must be square within 0.002 inch. The center of the hole is 1.000 inch from a long side and 1.500 inches from a short side, these dimensions to be matched in sets. On one of the 1⅝ × 3 inch faces, two holes 182 are drilled 5/16 inch to a depth of 1¼ inches and tapped ⅜ - 16 to a depth of 1 inch. They are centered between the 3 inch sides, and the center of each is ⅜ inch from a 1⅝ inch side. The bosses 112 are attached under plate 111 using ⅜ - 16 × 2 inch hexagon head cap screws 147 through holes 180 screwed into holes 182.

As seen in FIGS. 1 and 3, there are two carriage roller support plates 113 & 113' for the X axis. Plate 113 is shown in FIGS. 14 & 14A. It is made from ⅝ × 7 × 11¾ inch cold rolled steel, and a 2 × 1 × ⅛ × 1 inch long channel. The channel piece 183 has two holes 184 on each of the 1 × 1 inch sides. These four holes 184 are made with a No. 29(0.136) drill and tapped for No. 8-32 threads before welding. The hole centers are on the vertical center line ¼ inch from the top and bottom. The channel 183 is welded to the plate with its top surface 8⅜ inches from the top edge of the plate 113, and centered between the sides. Two holes 185 with centers ⅜ inch from the top edge and ¾ inch from the sides are drilled 13/32 inch. These holes 185 are used to attach the plate 113 to the pad 105 of the carriage assembly (FIG. 9), using ⅜ - 16 hexagon head cap screws 146. Normally the holes 163 of the pad 105 are used; but if the carriage is raised using the top holes on the legs, then the holes 164 of the pad are used. The hole 186 is centered vertically and its center is 8¾ inches below the center line of holes 185. This hole 185 is reamed with tolerance limits of 0.626 and 0.627 inches to provide a slip fit with a cam follower 132. Two holes 187 have their center line 2 inches below that of hole 186, ¾ inch from each side. These holes 187 are reamed to 0.4375 inch, a light tap fit with cam followers 133.

Figure 15:
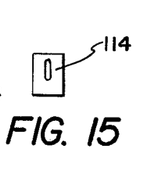
FIG. 15 is a view of a wiper for an X axis guide bar.

A wiper 114 for the X axis cam follower rail is shown in FIG. 15. It is a piece of 3/16 × 1 × 1⅜ inch nylon. Two 3/16 inch holes, centered between the vertical sides, one with a center ¼ inch below the top edge, and the other with its center ¾ inch below the first, are connected to form a slot 3/16 inch wide. There are four of these wipers. Two are attached to the channel 183 of plate 113, using the holes 184 to receive No. 8-32 × ½ inch long round head machine screws 142 with No. 8 flat washers 143. These wipers remove any work chips from the rail before the cam follower roller.

Figures 16, 16A:
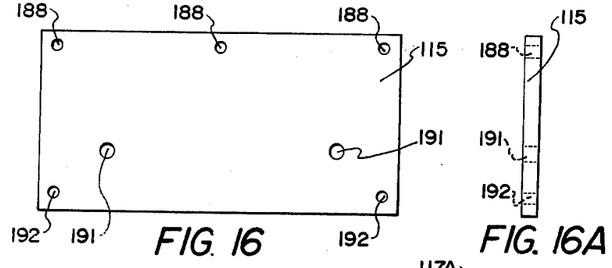
FIGS. 16 and 16A comprise an elevational and an end view of one of the carriage support roller plate for the Y axis.

There are two carriage support roller plates 115 & 115' for the Y axis. The plate 115 is shown in FIGS. 16 & 16A. It is made from ½ × 6 × 12¼ cold rolled steel. Three holes 188 are drilled 13/32 inch. These holes 188 have their centers ½ inch below the upper edge, and horizontally one is centered and two have their centers ⅜ inch from the edges. These holes 188 are used to attach the plates 115 & 115' to the drill head carrier plate 111 using holes 179, with ⅜ - 16 × 1¼ inch long socket head cap screws 148. There are two holes 191, with centers 4 1/16 inches from the top edge and 2¼ inches from the sides, which are reamed with tolerance limits of 0.501 and 0.502 inch to provide a slip fit with cam followers. The two holes 192 with centers 1⅜ inches below the center line of holes 191 and ½ inch from the sides, which are reamed to 0.375 inch to provide a light tap fit for cam followers.

The drill head is also attached to the drill head carrier plate 111 using the four holes 190, with ⅜ - 16 × 1¼ inch long socket head cap screws 148'. There are a total of 38 lockwashers 149 of ⅜ inch inside diameter used under the heads of the screws 145, 146, 147, 148 & 148'.

A carriage lock clamp screw 117A is shown in FIG. 17, which is used with a carriage lock clamp collar 118A shown in FIGS. 18 & 18A. The clamp screw 117A may be obtained from Reids, catalog No. AKA-7. It comprises an aluminum knob 193 and a steel screw 194. The knob 193 has a length of 1⅛ inches, and the screw 194 is threaded into the knob leaving an overall exposed length of 1¾ inches. The threads are size ½ - 13, and the end ¼ inch 195 is reduced to a diameter of 0.312 inch. The screw 194 is threaded into the hole 160 (FIGS. 8 & 9) of the carriage assembly 101; and the end 195 fits into a hole 196 of the clamp collar 118A. The clamp collar 118A has an outside diameter of 2¼ inches, an inside diameter of 1½ inches to mate with the shaft 13, and is ¾ inch wide. A similar clamp screw 117B (FIG. 3) and collar 118B (not visible) are used on the carriage assembly 101' for shaft 13'. The clamp collars may be obtained from "Boston", catalog No. SC150, as full circular collars, which are cut into two equal parts and finished as shown in FIG. 18. The ends of the inside diameter have a 1/16 × 45° chamfer.

A hand knob 127, and an auxiliary carriage lock clamp screw 116 are shown in FIGS. 19 and 20. The aluminum knob 127 is similar to know 193 in FIG. 17. It may be obtained from Reids, catalog No. STT-12R. The clamp screw 116 is made from ½ inch diameter × 56½ inch long cold rolled steel. It has a 7/32 inch pilot hole 197¾ inch from the end for a ¼ inch roll pin with the knob, after the end is inserted in the knob 127. At the other end, there is a 1½ inch long section 198 with ½ - 13 threads; and ¼ inch at the end 199 reduced in diameter to 0.312 inch. The clamp screw 116 passes through holes 170 & 170' of carriage assembly 101, and threaded into hole 168 of carriage assembly 101', with the end 199 fitted onto a collar 118C (not visible in FIG. 3) for shaft 13'. A similar knob 127' and clamp screw 116' are used for a collar 118D (not visible in FIG. 3) for shaft 13.

The auxiliary carriage lock clamp screws 116 and 116' provide a special feature. if an operator is working on the near side in FIGS. 1 and 3, after positioning the carriage in the X axis, the knobs 117A and 127 are used to lock the carriage to shafts 13 and 13' respectively. When, however, the operator is working on the far side, the knobs 117B and 127' to lock the carriage to shafts 13' and 13 respectively. Thus, the operator does not need to walk around the machine merely to lock to opposite side shaft positioning. The knobs 117C and 117D are used to lock to shafts 110 and 110' from either side; normally the drill head will be near the side where the operator is working.

The clamp screws 117C & 117D are the same as 117A as shown in FIG. 17. They are threaded into the holes 181 (FIG. 12). There are carriage lock clamp collars 119 & 119' (not visible in FIGS. 1 & 3) on clamp screws 117C & 117D, these collars being similar to 118A in FIG. 18, except for the dimensions. They are made from a "Boston", catalog No. SC100, collar cut into two equal parts. The outside diameter is 1⅝ inches, and the inside diameter is 1 inch for mating with shafts 110 & 110'.

Figure 21:
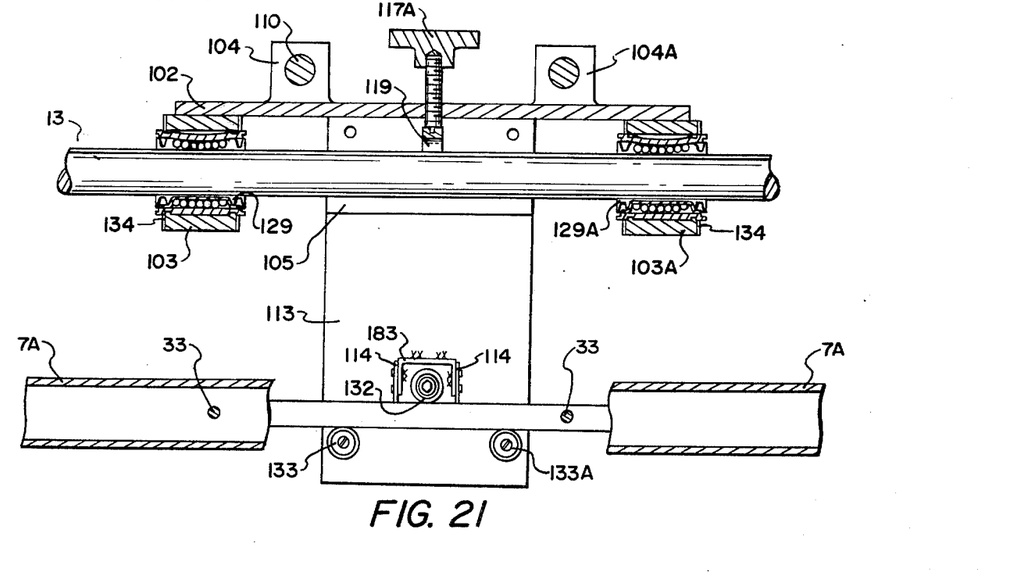
FIG. 21 is a vertical section view through the center of an X axis shaft along the length thereof showing how the carriage unit runs on the shaft and on a guide bar at each end.

The sectional view in FIG. 21 shows how the carriage is supported in the X axis. The view is taken vertically through the center of shaft 13 along the length thereof, looking outwardly (toward the left in FIGS. 1 & 3)., As a further aid in visualizing the section line, reference may be made to the carriage assembly drawing shown in FIG. 9B, wherein the section line would be along the rear edges of blocks 104 & 104A, looking forward toward plate 105. The parts of the carriage assembly 101 shown in both FIGS. 9B & 21 comprise the channel 102, the bosses 103 & 103A, the blocks 104 & 104A, and the pad 105.

The carriage roller support plate 113 (FIG. 14) is attached behind 105 in the view of FIG. 21, and extends downward. It carries the cam followers 132, 133 & 133A. The section passes through member 7A, which is broken away in FIG. 21 to show the cam followers and the guide bar 12 on which they run. Note that the guide bar 12 is attached to member 7A by the screws 33, which are 13¼ inches between centers. The channel piece 183 carries wipers 114, which clear chips from the guide bar 12 before cam follower 132.

The bosses 103 & 103A contain ball bushings 129 & 129A respectively, held by retaining rings 134 at each end of each bushing. These bushings contain ball bearings arranged in races for linear motion. The ball bushings and the shafts on which they operate may be obtained from Thomson Industries, Inc., Manhasset, New York 11030. The four bushings 129 etc. for the X axis are catalog No. A-243848; and the four bushings 128 etc. for the Y axis are catalog No. A-162536. The shafts are type S. The shaft acts as the inner bearing race for the ball bushing. To assure a long service life, it should be hardened to Rockwell 58–63C to an adequate depth. To provide smooth operation and high precision, it must be smooth, round and unusually straight. The class S shafts meet these requirements.

The special ball bushings and shafts permit precise positioning along the X and Y axes. However, to provide smooth operation and to maintain the precision, it is necessary that there be substantially zero deflection of the shafts. According to the invention, any significant deflection of the shafts is prevented by use of the cam followers operating on guide bars. Since the guide bars are supported along their entire length, there is no particular limit to the span of the shafts. Thus, the eight-foot length of the X axis is chosen only because it is a convenient size, and could be much greater.

Figure 22:
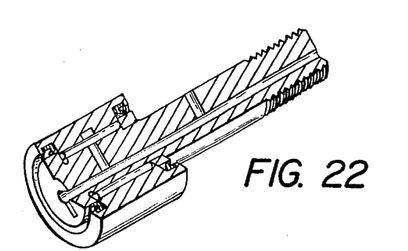
FIG. 22 is a sectional perspective view of a cam follower.
Figure 23:
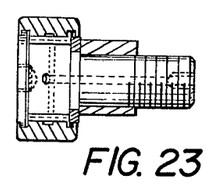
FIGS. 23 and 24 are two sectional views of an eccentric (adjustable) cam follower.
Figure 24:
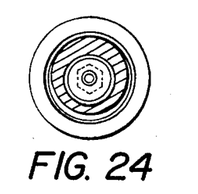

The cam follower type bearins shown in FIGS. 22–24 obtained from McGill have the trademark CAMROL. FIG. 22 shows a bearing of the SCF series, which for the four bearings 131 of the Y axis have catalog No. CF-¾-S, and for the four bearings 133 and 133' of the X axis have catalog No. CF-1-S. The Y axis bearings such as 131 have a roller diameter of 0.750 inch, a roller width of 0.500 inch, a stud diameter of 0.375 inch, a stud length of ⅞ inch, and ⅜ - 24 threads. The X axis bearings such as 133 have a roller diameter of 1.000 inch, a roller width of 0.625 inch, a stud diameter of 0.4375 inch, a stud length of 1 inch, and 7/16 – 20 threads. FIGS. 23 and 24 show two views of bearings of the CFE-SB series, which for the four bearings 130 of the Y axis have catalog No. CFE-¾-SB, and for the two bearings 132 and 132' of the X axis have catalog No. CFE-1-SB. The roller diameter and width, the stud length and the threads of bearings 130 are the same as 133. The CFE-SB series of bearings such as 130 and 132 have an eccentric stud which permits adjustment of the roller, using the hexagonal socket.

Drilling Head Assembly

Figure 4:
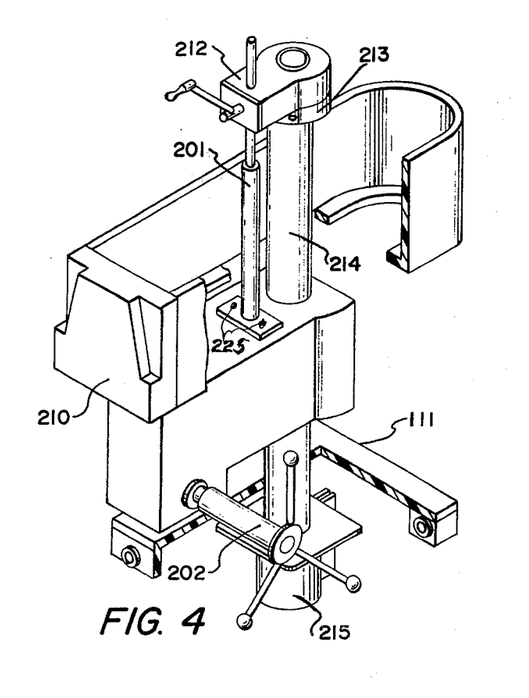
FIG. 4 is a perspective view of a part of the drilling head assembly, partially broken away.

The principal item of the drilling head assembly is a 15-inch drill head 210 obtained from "Clausing" shown in FIG. 1. In FIG. 4 only a portion of this item 210 is shown. Also obtained from Clausing are a head lift and flange assembly 212, catalog No. 1613; a column collar 213, catalog No. 1615; a column 214, catalog No. 1693; a column mounting flange 215, catalog No. 1695; and a drill press lamp 216, catalog No. 7022.

A drill head lifter screw holder bracket 201 is made from a piece of ½ × 1¼ × 3¼ inch cold rolled steel at the base, and a piece of ⅞ outside diameter × ⅝ inch inside diameter × 10 inch long seamless steel tubing. The drill head lifting parts 201, 212 and 213 are shown only in FIG. 4.

A drill head handle shaft extension 202 is made from 2 inch diameter × 7 inch long aluminum. At one end there is a hole bored with tolerance limits of 1.250 and 1.251 inches to a depth of 2⅜ inches. At a distance of 1½ inches from the same end a 7/32 inch hole is drilled as a pilot for a ¼ inch roll pin. At the other end a length of 1⅝ inches is reduced in diameter to a tolerance of 1.250 and 1.249 inches.

The bracket 201 has two 11/32 inch holes in the bottom piece, through which two hexagon head cap screws 225 of size 5/16 – 18 × 1 inch long, with 5/16 lockwashers are used to attach it to the drill head 210.

Operation

The drill press should be level and rest solidly on the floor. Adjust each leg, with leveling screws 22A to 22G, to provide equal pressure.

Raising & Lowering Head

Loosen the head lock. Turn the hand crank 220 (FIG. 4) which is mounted on top of the drill press column. It should be raised a sufficient amount so that the drill chuck clears the column base. This makes it possible to turn the head 180° to permit use from either side of the frame. The drill chuck must at all times be centered between the cross channels 108 & 108' during operation. The drill head may be lowered to an appropriate height for drilling and tapping.

Positioning of Carriage and Cross Slide

The carriage is pushed along the X axis to the desired position as indicated on the TRAVADIAL indicator 25, and the cross slide is pushed along the Y axis to the desired position as shown on the TRAVADIAL indicator 26.

Locking Carriage & Cross Slide

The carriage and cross slide must be locked during drilling or tapping operation. If working on the near side as shown in FIGS. 1 & 3, the knobs 117A & 127 are used to tighten the lock screws of the near and far side carriage to the X axis shafts 13 & 13' respectively. There are similar knobs for use when working on the far side. The two knobs 117C & 117D on the cross slide are used to tighten the lock screws to the Y axis shafts 109 & 109'. These screws must be locked during drilling and tapping operation. A light amount of locking pressure is all that is required - do not overtighten.

Alternative Embodiments

In FIG. 1, a drill head is shown, which is capable of drilling and tapping operations. However, with suitable heads, there are many other machine operations which can be performed, while taking full advantage of the novel X-Y positioning arrangement according to the invention. In general, the apparatus may be used in the metal, plastics, and wood cutting industries. A router type head can be used to cut in the X and Y axes. It can be used to cut patterns. The apparatus could accommodate a saw, to move and saw parts off a work piece, or for positioning and sawing prescribed lengths. Another possibility is to put a master on one part of the table, and provide to make a duplicate on another part of the table. Also, the apparatus may be used as a layout facility, to scribe lines on steel with a special head. Many other options will be apparent to those skilled in the art.

For the apparatus of FIG. 1, in place of an auxiliary to the position indicators 25 and 26, linear scales and moving pointers may be attached. Preferably the scales would have 1/64 inch gradations.

What is claimed is:

1. Apparatus for coordinate positioning of a machining unit, wherein said apparatus comprises a frame assembly, a carriage unit, and a cross slide unit carrying said machining unit;

said frame assembly comprises a support structure with a work bed for receiving work pieces for machining, two main shafts extending in a first direction, each main shaft having its two ends attached to said support structure, two first guide means parallel to said main shafts and mounted on and supported by said support structure;

said carriage unit comprises two end members, and two cross shafts extending in a second direction, each cross shaft having its two ends attached respectively to said two end members, each end member having main-shaft bearing means running on one of said main shafts and first moving support means running on one of said first guide means with a rigid structure between said main-shaft bearing means and said first moving support means;

said cross slide unit having two cross-shaft bearing means running respectively on said two cross shafts, and a bridge mounted between said cross-shaft bearing means to carry said machining unit;

whereby the carriage unit may be accurately positioned along the main shafts, and the cross slide unit may be accurately positioned along the cross shafts, to locate the machining unit for a machining operation on the work piece.

2. Apparatus as set forth in claim 1, wherein said carriage unit includes cross-structure means mounted to said two end members to provide a rigid assembly, two second guide means parallel to said cross shafts and attached to said cross-structure means;

said cross slide unit includes two side members, two second moving support means running respectively on said second guide means, each side member being attached to one of said cross-shaft bearing means and to one of said second guide means to form a rigid structure.

3. Apparatus as set forth in claim 2, wherein each of said main-shaft bearing means and each of said cross-shaft bearing means comprises two ball bushings in tandem on the same shaft, each ball bushing having ball bearings arranged for linear motion.

4. Apparatus as set forth in claim 3, further including a collar individual to each of said shafts, each collar having a semicylindrical surface of substantially the same radius as the associated shaft, and clamp screw means attached to each collar to tighten the collar into engagement with the shaft, to thereby lock said carriage unit to said main shafts and to lock said cross slide unit to said cross shafts.

5. Apparatus as set forth in claim 4, further including an auxiliary collar for each main shaft, each auxiliary collar having an auxiliary clamp screw means attached thereto extending from one of said end members to the other of said carriage unit to permit the carriage unit to be locked to both main shafts from either side of said apparatus.

6. Apparatus as set forth in claim 5, wherein said collars for each shaft are located between the said two ball busings on the shaft.

7. Apparatus as set forth in claim 3, wherein said main shafts and said cross shafts are case hardened and are precisely smooth, round and straight; and wherein said ball bushings are precision units.

8. Apparatus as set forth in claim 2, wherein said two first guide means and said two second guide means each comprises a guide bar having a rectangular cross section, and said first moving support means and said second moving support means each comprises a plurality of cam follower type bearing units with rollers running on both the upper and the lower surfaces of the guide bars.

9. Apparatus as set forth in claim 8, wherein each of said two end members of said carriage unit has wiper means attached thereto to clean the associated guide bar.

10. Apparatus as set forth in claim 8, wherein some of said cam follower type bearing units have an eccentric offset so that the position of the roller with respect to the guide bar is adjustable.

11. Apparatus as set forth in claim 8, wherein the height of said main shafts with respect to said work bed is adjustable by changing the point of attachment of the ends of the main shafts to the support structure, and by changing the distance between said main shaft bearing means and said first moving support means.

12. Apparatus as set forth in claim 1, further including a first dial indicator attached to said carriage unit to run on one of said main shafts to indicate the position of the carriage unit in the first direction, and a second dial indicator attached to said cross slide unit to run on one of said cross shafts to indicate the position of the cross slide unit in the second direction.

13. Apparatus as set forth in claim 1, and including means to adjust the height of said main shafts with respect to said work bed by changing the point of attachment of the ends of the main shafts to the support structure, and by means to change the distance between said main shaft bearing means and said first moving support means.

14. Apparatus as set forth in claim 1, wherein said machining unit includes means to raise it and to rotate it about a central support so that it may face either side of said apparatus.

15. Apparatus as set forth in claim 1, wherein said machining unit is a drill press.

16. Apparatus as set forth in claim 1, further including means to lock said carriage unit in position in said first direction, and means to lock said cross slide unit in position in said second direction.

17. Apparatus as set forth in claim 1, wherein in said carriage unit each of said two end members comprises a base which is a structural steel channel having a horizontal central section and two vertical side sections, two main bosses welded under the respective ends of the central section, two blocks for the cross shafts welded on top of the central section symmetrically in from the ends, said main bosses being cylindrical with holes bored with their axis parallel to the longitudinal center line of said base and with a precise diameter and straightness, said blocks for the cross shafts having holes bored with their axes perpendicular to the vertical plane through the longitudinal center line of said base with a precise diameter and straightness, said main-shaft bearing means for each end member comprising two ball bushings inserted into said holes bored in the main bosses;

said cross shafts having their ends inserted into said holes bored in said blocks for the cross shafts.

18. Apparatus as set forth in claim 17, wherein in said carriage unit each of said two end members further comprises an outer pad welded to the outer one of said side sections of said base, a main roller support plate attached by screws to said outer pad;

wherein said two first guide means each comprises a guide bar having a rectangular cross section;

wherein said first moving support means comprises a plurality of cam follower type bearing units attached to said main roller support plate with rollers running on said guide bar.

19. Apparatus as set forth in claim 18, further including nylon wipers attached to a projecting support welded to said main roller support plate to clean the upper surface of the guide bar ahead of the roller of a cam follower type bearing unit when moving in either direction.

20. Apparatus as set forth in claim 18, wherein said frame assembly includes four corner legs each having an upper portion with four holes having centers at equal intervals with their axes in said first direction, for each corner there being a shaft support and an end cap, each shaft support having a large center hole with a diameter for receiving the end of a main shaft and two tapped holes on either side of the center hole, the three holes of the shaft support having their centers at said equal intervals, each end cap having three holes spaced at said equal intervals, each main shaft having a tapped hole in the center of each end, three main shaft attachment screws for each corner extending respectively through the holes of the end cap then through either the lower three holes or the upper three holes of the leg, then screwed into the tapped holes of the shaft support and the shaft, the choice of the upper or lower three holes of the legs providing an adjustment for the height of the main shafts with respect to said work bed;

wherein said outer pad of each end member has an upper set and a lower set of tapped holes, said main roller support plates being attached to either the upper set or the lower set to correspond to the choice of the upper or lower holes of the legs.

21. Apparatus as set forth in claim 18, wherein of said cam follower type bearing units, one has its roller running on the upper surface of the guide bar and two have their rollers running on the lower surface of the guide bar.

22. Apparatus as set forth in claim 21, wherein the cam follower type bearing unit having its roller running on the upper surface of the guide bar has an eccentric offset so that the position of the roller with respect to the guide bar is adjustable.

23. Apparatus as set forth in claim 18, wherein in said carriage unit each of said two end members further comprises two inner pads welded to the inner one of said side sections of said base;

wherein said rigid structure of the carriage unit comprises two cross channels each having a vertical center section and upper and lower horizontal side sections, each cross channel having an end plate welded to each end, each end plate being attached with screws to one of said inner pads of an end member, with the side sections of the two cross channels extending toward each other;

second guide means comprising two cross guide bars attached respectively to the center sections of said cross channels;

and cam follower type bearing units attached to said cross slide unit and running on said cross guide bars.

24. Apparatus as set forth in claim 23, wherein said cross slide unit comprises a machine head carrier plate, two cross roller support plates attached to opposite sides of the machine head carrier plate, and four cross-shaft bosses attached under the four corners of the machine head carrier plate;

said cross-shaft bosses having holes bored with axes in said second direction with precise diameter and straightness, said cross-shaft bearing means being four cross-shaft ball bushings inserted respectively in the four cross-shaft bosses, each cross shaft passing through two of the cross-shaft ball bushings in tandem;

and said cam follower type bearing units attached to said cross slide unit are attached to said cross roller support plates, with two running on the upper surface and two running on the under surface of each cross guide bar, some of the cam follower type bearing units of the cross slide having an eccentric offset for adjustment.

25. Apparatus as set forth in claim 24, further including a collar and a clamp screw attached thereto for each main shaft and each cross shaft for locking the carriage and the cross slide in position for machine operations.

26. Apparatus as set forth in claim 25, wherein said machining unit is a drill press.

27. Apparatus as set forth in claim 1, wherein said work bed comprises a base structure, and replaceable strips attached to said base structure, adapted to receive work pieces on said strips so that a machine tool penetrating the work pieces may strike said strips rather than the base structure.

28. Apparatus as set forth in claim 27, wherein said base structure comprises steel tubing having a flat upper surface, and said strips are of nylon attached on top of said steel tubing, with substantial space between the strips.

* * * * *